US008891660B1

(12) United States Patent
Wise

(10) Patent No.: US 8,891,660 B1
(45) Date of Patent: Nov. 18, 2014

(54) ONBOARD ACTIVITY INFLUENCED MULTI-ANTENNA PAIRING SYSTEM FOR MOBILE COMMUNICATION PLATFORM

(71) Applicant: MTN Satellite Communications, Seattle, WA (US)

(72) Inventor: Robert M Wise, Issaquah, WA (US)

(73) Assignee: Maritime Telecommunications Network Inc, Seattle, WA (US)

(*) Notice: Subject to any disclaimer, the term of this patent is extended or adjusted under 35 U.S.C. 154(b) by 0 days.

(21) Appl. No.: 14/185,889

(22) Filed: Feb. 20, 2014

Related U.S. Application Data

(63) Continuation of application No. 14/054,798, filed on Oct. 15, 2013.

(60) Provisional application No. 61/713,673, filed on Oct. 15, 2012, provisional application No. 61/714,272, filed on Oct. 16, 2012, provisional application No. 61/715,175, filed on Oct. 17, 2012, provisional application No. 61/832,823, filed on Jun. 8, 2013.

(51) Int. Cl.
*H04B 7/02* (2006.01)
*H04L 1/02* (2006.01)
*H04B 7/08* (2006.01)

(52) U.S. Cl.
CPC .................................. *H04B 7/0817* (2013.01)
USPC ............................ 375/267; 375/259; 375/260

(58) Field of Classification Search
USPC ........................................................ 375/267
See application file for complete search history.

(56) References Cited

U.S. PATENT DOCUMENTS

| 6,061,029 A * | 5/2000 | Hisada ........................... 343/713 |
| 2004/0164913 A1* | 8/2004 | Ogino ........................... 343/713 |
| 2013/0271342 A1* | 10/2013 | Shen ............................. 343/861 |
| 2014/0140435 A1* | 5/2014 | Zhang et al. ................... 375/295 |

* cited by examiner

*Primary Examiner* — Erin File
(74) *Attorney, Agent, or Firm* — FSP LLC

(57) ABSTRACT

A system includes a vehicle and logic that performs predictive pairing of multiple antenna of the vehicle with multiple fixed antenna of a port the vehicle is approaching, the predictive pairing performed using data obtained about the multiple fixed antenna obtained via a satellite, the predictive pairing prioritizing maximum spatial diversity in the pairings of the antenna of the vehicle with the fixed antenna.

9 Claims, 6 Drawing Sheets

ONBOARD ACTIVITY INFLUENCED MULTI-ANTENNA PAIRING SYSTEM FOR MOBILE COMMUNICATION PLATFORM

PRIORITY CLAIM

The present application claims priority under 35 U.S.C. 119 to U.S. application Ser. No. 61/713,673 filed on Oct. 15, 2012, and under 35 U.S.C. 119 to U.S. application Ser. No. 61/714,272 filed on Oct. 16, 2012, and under 35 U.S.C. 119 to U.S. application Ser. No. 61/715,175 filed on Oct. 17, 2012, and under 35 U.S.C. 119 to U.S. application Ser. No. 61/832,823 filed on Jun. 8, 2013, each of which is incorporated herein by reference.

BACKGROUND

Multiple moving communication platforms (MCPs, e.g., ships, trucks, trains, busses) may come into communication range of multiple shore-side antennas (antennas fixed to the surrounding area). Communication between antennas on-board the MCPs and the shore-side antennas should be established in an efficient and logical manner.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

Figure 1:
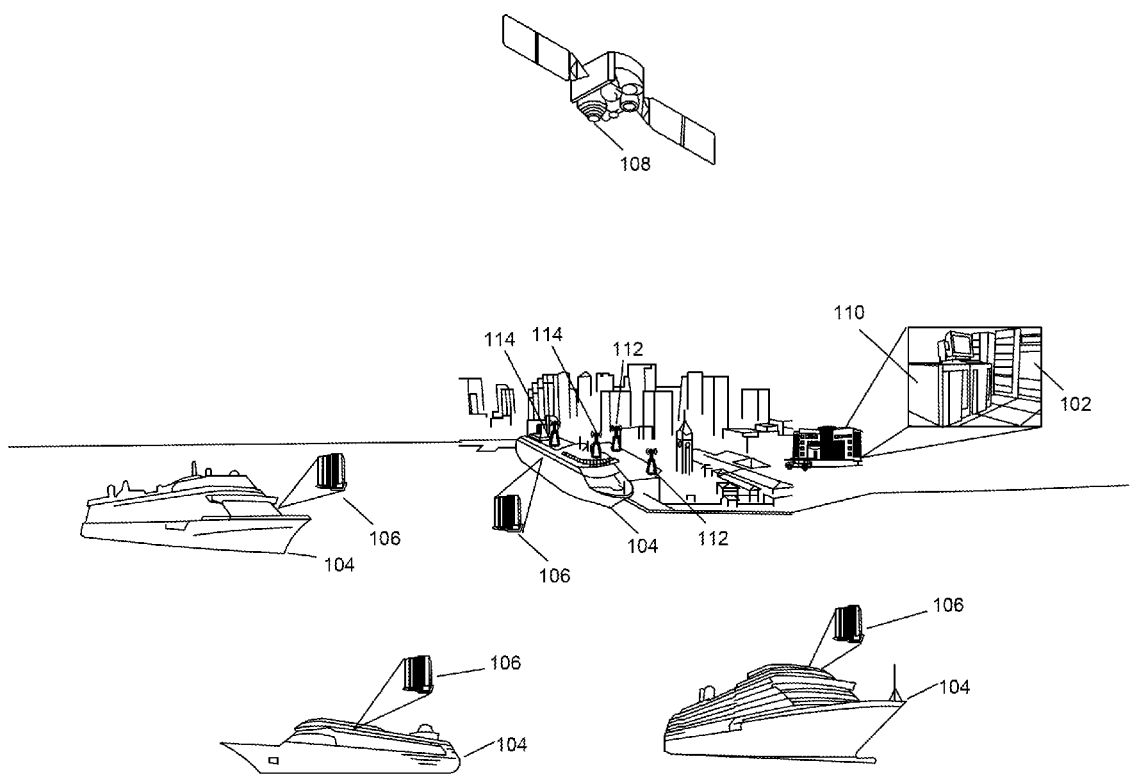
FIG. 1 illustrates a communication environment for multiple moving communication platforms (e.g., ships) that utilize satellite communication and port-side antennae.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

The following terminology and acronyms may be used in the description which follows:

CIR: Committed Information Rate—the guaranteed minimum amount of bandwidth committed to a customer, application or remote site MIR: Maximum Information Rate—the maximum amount of bandwidth allocated to a customer, application or remote site based on availability and not guaranteed Bandwidth Pool: A specific segment of bandwidth that is typically shared between multiple customers, sites or ships in a region.

VSAT: Very Small Aperture Terminal

Wireless: includes WIFI, LTE, WIMAX, 3G, 4G and any other wireless communications technologies.

CBM: Central Bandwidth Manager—located in a central data center

LSS: Local Service Selector—located on individual vessels, remote sites or vehicles NMS: Network Management System MCP: Mobile Communications Platform (includes ships, land vehicles (trucks, trains, cars . . . ), and aircraft).

Shore side: Refers to any fixed (non-mobile) location in the area of an MCP.

Priority content: Refers to content that is assigned, via structural modifications to a machine memory, as association with a priority value that indicates the content has priority for purposes of promotion or syncing (e.g., priority with respect to utilization of available network bandwidth and/or machine resources such as memory, processor utilization, etc.).

Instantaneously computed: Refers to a value determined as parameters to a deterministic computation become defined or updated. "Instantaneous" does not require absolute immediacy in time, but does imply that the determined value closely tracks changes in the values of the parameters that determine it.

External network: Refers to a network that is not moving with an MCP, and which is accessed wirelessly via a network bridge or switch device.

Queue: Refers to a first-in, first-out structural arrangement for data flow through a machine memory. Queues have a length which is a number of distinct content items awaiting action in the queue.

Expected delay, Expected bandwidth: Refers (1) to a delay value deterministically computed rather than measured after the delay occurs, (2) to an available machine network bandwidth resource deterministically computed rather than measured as a contemporaneous available network bandwidth.

Passenger account: Refers to settings stored inside a machine system memory that reflect and define assets of a passenger available as compensation to third parties via a settlement machine network (e.g., MasterCard, Visa, Discover, American Express).

Normal content: Refers to content that is not priority content.

Content size: Refers to a count of a memory storage metric such as bits or bytes, where bits or bytes correspond to machine memory cells.

Event Duration: Refers to a time or distance or both between a defined starting point of an event and a defined ending point of an event. Start and ending times for an event may be defined in a machine system as stored values in a machine memory configuration, the stored values corresponding to (for instance) rights of occupancy of a person on an MCP. A "total trip" for instance is the time or distance between when a passenger first embarks on the MCP and when they disembark due to their right of occupancy expiring, or voluntarily before that time.

Storage: Refers to alteration of a machine memory material/energy configuration to reflect values and relationships among those values, where the values translate (directly or indirectly) to quantities, qualities, states, or things in the physical world, or into control signals to a processor or controller circuit.

Rules: Refers to a configuration of machine memory defining the machine's behavior when manipulating particular stored information toward a particular result.

Bandwidth: Refers to information transfer capacity over one or more links of a machine communication network. "Higher" bandwidth refers to conditions when greater amounts of data transfer may be affected over the network, relative to some defined lower bandwidth situation. "Bandwidth allocation" is the process of altering settings in memory of a machine network to associate an amount of bandwidth resources on one or more network links to particular content, people, machines, or machine processes (or combinations of these).

Port: Refers to any location at which an MCP may stop or pause a trip. Usually, passengers of the MCP may disembark at a port.

Bandwidth-limited zone: Refers to a geographical area in which bandwidth is lower relative to a defined other area.

Filter: Refers to a machine-implemented process of applying criteria against content or relationship attributes and selectively identifying which content/relationships meet the criteria and which do not, and taking some action in response to those identifications.

Cache: Refers to temporary storage of content or other social media in a machine memory and association of the content or other data with a social media context, prior to promotion of the content or syncing of the content into a different context.

Content: Refers to organizations of machine memory representing real-world physical phenomenon such as images, audio, music, a sequence of keystrokes, and activities on a machine interface (speech, gestures, drawing, selections, sliders, etc.). Content may be applied to transducers to create visual displays on an optical output device (displays) or to produce vibrations via (for example) speakers.

back-haul bandwidth: Refers to the bandwidth available on a network link "behind" a network access point (e.g., a wireless access point having an antenna). "Behind" refers to a link between the network access point and a WAN or LAN to which the network access point provides a point of access.

predictive pairing: Refers to selecting pairs of antennas for future communications between the selected antennas, based on present and/or predicted future factors.

antenna pairing: Refers to establishing a communication channel between two antennas. Communications from antennas not paired with one another may be ignored (not processed into control signals to attached devices)/ front-side bandwidth: Refers to bandwidth available for antenna pairing, e.g. bandwidth available between a network access point device and an antenna of a device attempting to utilize the network access point.

antenna spatial diversity: Refers to a pairing configuration for multiple pairs of antenna, and is a measure of the number of 'overlapping' pairings, in which one antenna is paired with more than one other antenna. Maximum spatial diversity refers to a minimization of the number of overlapping pairings, under any specified constraints.

weighting function: Refers to logic that performs manipulation of values, at least one of which represents a physical measurement, to derive an output that is then applied as a multiplier or divisor of the weighted value.

weighting constant: Refers to a value applied as a multiplier or divisor of the weighted value.

channel bonding: Refers to combining bandwidth from multiple communication channels into a single channel (e.g., at the application network layer).

tracking antenna: Refers to an antenna that physically re-orients to follow a signals and maintain signal strength at or close to a maximum or acceptable level.

communication channel: Refers to a quantity of bandwidth, or a range of frequencies, assigned and allocated for communication by a device.

arbiter: Refers to a device or logic that arbitrates access to a shared machine or network resource or component.

passenger device: Refers to a device, often wireless as to communication with an MCP local area network, operated by a passenger aboard an MCP.

on-board application: Refers to an application available or enabled via a local area network of an MCP.

Social media: Refers to an organized collection of content relating to a person's friendship, family, pets, or other personal or professional life, involving identification of people and relationships between the people at a personal or professional level. The organized content is collectively subject to privacy restrictions specific to the person (user) to whom it all pertains.

Global social media context: Refers to a machine organization defining content and relationships between content for one or a group of people, the content and relationships not limited to the circumstances of a particular trip aboard an MCP.

social media: Refers to

DESCRIPTION

Referring to FIG. 1, bandwidth allocation and connection setup for MCPs 104 utilizing satellite 108 communications is managed and controlled by two independent but cooperating systems. They are:
 1) Central Bandwidth Manager (CBM) 102
 2) Local Service Selectors (LSS) 106 that are mobile and located on each MCP 104

The CBM 102 is responsible for the overall monitoring and control of the bandwidth/connection allocation process. The CBM 102 interfaces with various Network Management Systems 110 (like the iDirect NMS), to obtain real-time bandwidth allocation and utilization data at the network, MCP 104 and application levels. The CBM 102 also interfaces with the LSSs 106 on each MCP 104 to determine the status of the connectivity options available to each MCP. The LSS 106 is responsible for making local routing decisions based on real-time connectivity circumstances as well as pre-set rules and thresholds. The LSSs 106 routing decisions can also be driven by commands from the CBM 102. Once a routing decision is made and executed, the CBM 102 instructs the relevant NMS 110 to reallocate the bandwidth across the remaining MCPs 104.

In one embodiment, an MCP is fitted with multiple wireless (e.g., WiFi) antennas 114. The MCP includes logic to perform predictive coupling between (1) the multiple on-board antennas 114 and (2) multiple fixed antennas 112 in the area around a current location of the MCP. A communication channel to a satellite 108 is utilized to ascertain features of the fixed antennas 112 before the MCP reaches port, i.e. before the MCP comes into communication range of the fixed antennas 112. The MCP's velocity and trajectory, along with its known destination or route, may be taken into account when evaluating which fixed antennas 112 to pair with which on-board antennas 114. Other factors of interest may include the back-haul available bandwidth of the fixed antennas 112 and the front-side available bandwidth of the fixed antennas 112. Each of these last two factors may be influenced by the presence or predicted presence of other MCP's in the area of the fixed antennas 112 (e.g., at the same port).

Figure 2:
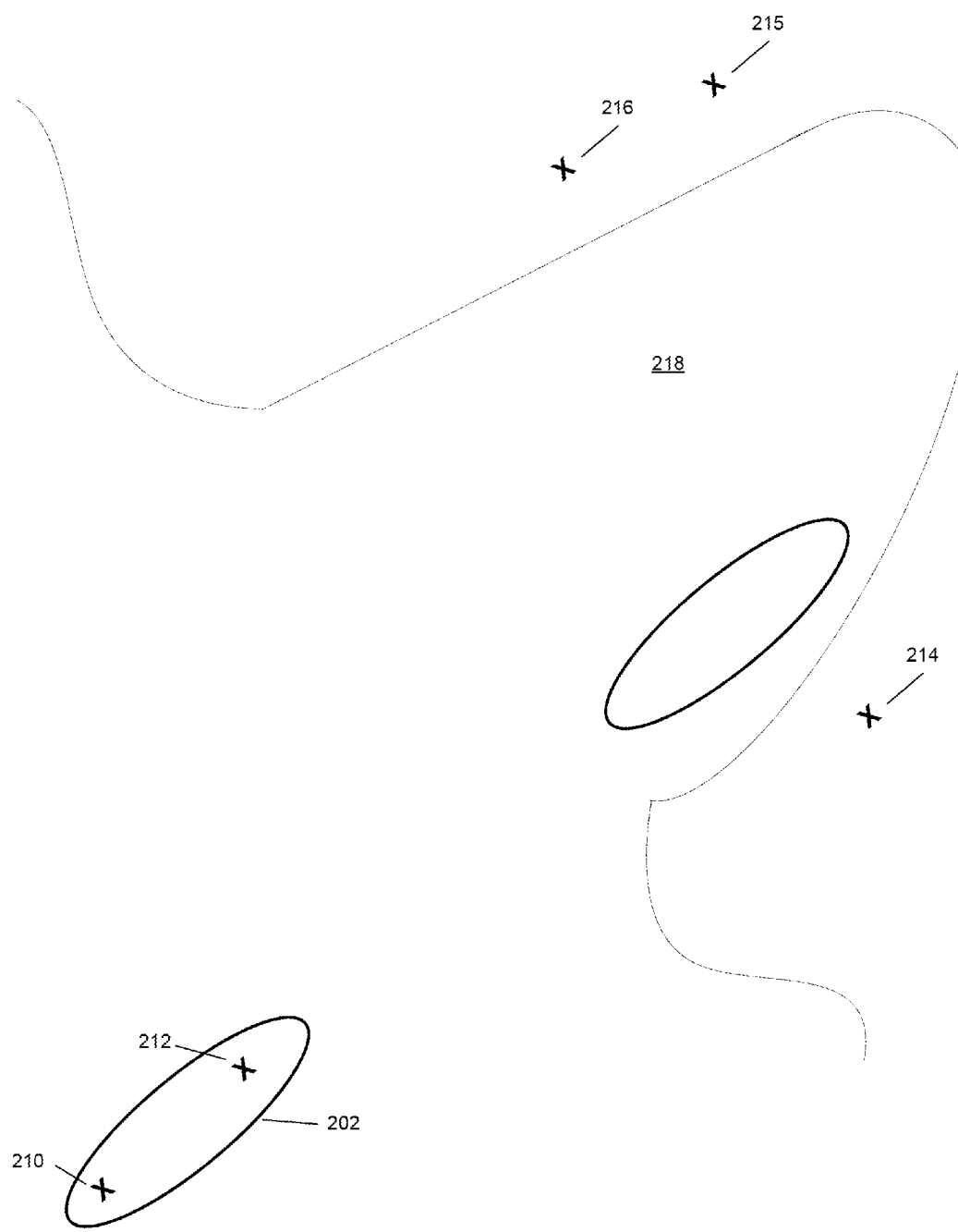
FIG. 2 illustrates an example of predictive spatial coupling for a ship approaching a port.

FIG. 2 illustrates an effect of predictive coupling in an example situation in which an MCP 202 is approaching a port and includes two on-board antennas 210 and 212, one forward and one aft. Three fixed antennas 214, 215, and 216 at the port are located on various sides of a channel 218. The ship's trajectory brings the forward antenna 210 into communication range of the fixed antenna 214 first. A predictive evaluation by the MCP 202 before coming into range of the port antennas has however indicated that, due to the presence of other MCPs at the port, the back-haul bandwidth of antenna 214 is limited, rendering antenna 214 less suitable than antennas 215 or 216 for coupling with forward antenna 210. Communication with the shore-side antennas is thus delayed until aft antenna 212 comes into communication range of antenna 214. As previously noted, antenna 214 has a limited back-haul bandwidth capacity as compared with fixed antennas 215 and 216. However, pairing antenna 212 with antenna 214 may achieve higher spatial diversity than pairing antenna 212 with antenna 215, and will also enable communication between the MCP and the port sooner. Thus, antenna 214 is selected to pair with antenna 212, and antenna 216 is selected to pair with antenna 210.

In some implementations, the predicted trajectories of MCPs at the port, or approaching or leaving the port, may also be taken into account. Thus, if antenna 214 has a limited back-haul capacity presently due to utilization by one or more MCPs at the port, but one or more of those MCPs is predicted to leave the port within a certain time frame, this may impact the weight given to the limited back-haul capacity of antenna 214 in the evaluation of whether to pair it with the forward or aft antennas 210, 212 (because the limited back-haul may in fact be less limited within the time-frame for the approaching MCP).

Thus, a device of the MCP (e.g., the LSS) may include logic for pairing antennae on the MCP with fixed antennae in an area surrounding the MCP. The LSS may communicate via a satellite uplink to obtain location information, front side bandwidth information, and backhaul bandwidth information for the fixed antennae. The LSS may predict a pairing the antennae on the MCP with the fixed antennae, according to $$E = A*\text{diversity} + C*\text{front side bandwidth} + D*\text{backhaul bandwidth}$$

where A, C, and D are weighting functions or constants, and where the term A*diversity has greater weight than the other terms that determine E.

In one embodiment, the MCP includes logic to seek maximum spatial diversity between (1) the multiple on-board antennas 114 and (2) multiple fixed antennas 112 in the area around a current location of the MCP. i.e. shore side. Maximum spatial diversity means the MCP attempts to pair each on-board antenna 114 with exactly one shore side antenna 112, and vice versa. This maximum diversity is prioritized over signal strength between the on-board antennas and the fixed antennas. In other words, achieving maximum spatial diversity between the antennas is the primary consideration informing the unique pairings, and signal strength is a secondary consideration that may be overruled by the consideration of maximum spatial diversity.

The logic on board the MCP may further take into account the available bandwidth on the links connecting the fixed antennas 112 to the Internet, or a private terrestrial network, known as backhaul or backlinks. When selecting which on-board antenna to pair with which fixed antenna, a weighted determination may be based on (1) the effect of the pairing on spatial diversity, (2) the strength of the signal between the on-board and fixed antenna, (3) the bandwidth available between the on-board antenna and the fixed antenna, i.e. front-side bandwidth (affected by but not solely determined by #2), and (4) the backhaul bandwidth of the fixed antenna.

By way of example, let A, B, C, and D be weighting constants, or weighting functions. A greatest weight may be assigned to spatial diversity, i.e. no two MCP antennas paired with the same shore side antenna:

For each possible pairing of MCP and shore side antennas:
{
[1]E=A*diversity+B*signal strength+C*front side bandwidth+D*backhaul bandwidth
If E>=Ebest then
Ebest=E
Endif
}
Pick pairing that yielded Ebest.

This example may be extended to a multi-variable optimization, to select the pairings that maximize average of the weighted function E over all MCP antennae.

Maximum spatial diversity may be sought and selected for the antennas on board the MCP and the fixed antennas in the surrounding area even at the cost of some signal strength, front side bandwidth, and/or backhaul bandwidth between the on board antennas and the fixed antennas.

In one embodiment, a satellite uplink aboard the MCP is utilized to ascertain available backhaul and/or front side bandwidth for each shore side antenna, and/or to set the backhaul and/or front side bandwidth allocated to each on-board antenna. A bonded communication channel may be formed from the set of channels between MCP and fixed antenna, and the satellite channel as well. Thus, a satellite channel may be used to determine pairings between on-board antennae and shore-side antennae, and as a management channel for connections from the MCP to shore side antennae, and once the connections to shore side are established, the satellite channel may be bonded into a single logical channel that includes the shore side connections, so that connection management signals and data traffic are both carried (potentially or actually) over all of the connections (satellite and shore side) available to the MCP.

Figure 3:
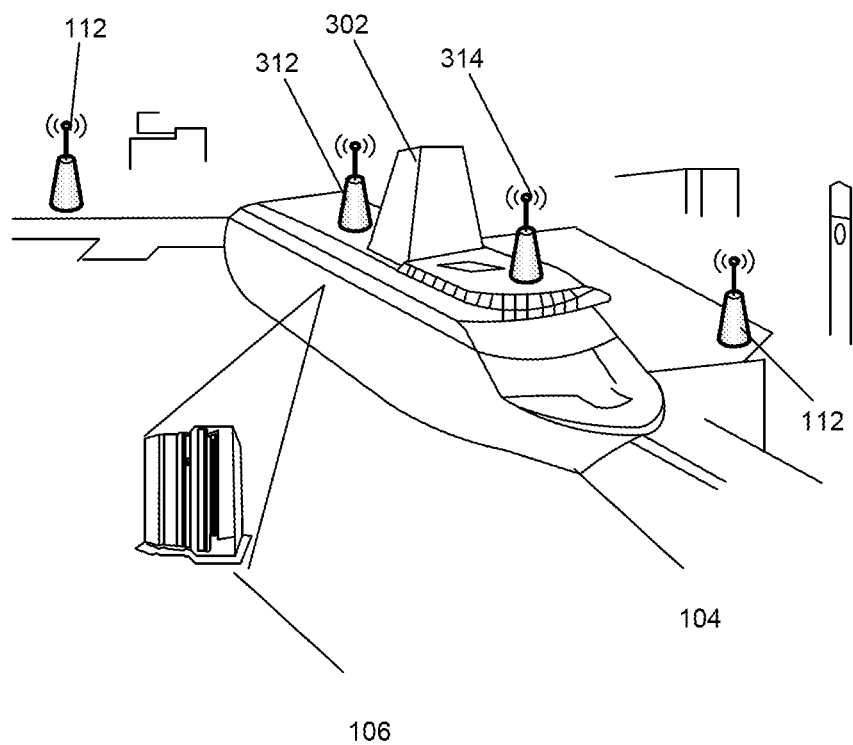
FIG. 3 illustrates an embodiment of a two antennae layout for an MCP having a wireless obstruction.

FIG. 3 illustrates an embodiment of a two antennae layout for an MCP having an obstacle to wireless signals. Each antenna 312, 314 is a stabilized tracking antenna. One antenna 312 is located at or toward an aft end (trailing motion end) of the MCP 104 (in this example, a ship), and one antenna 314 is located at or toward a forward end of the MCP 104 (forward motion end). A wireless communication obstruction 302 is interposed between the two antennae.

In this embodiment the LSS 106 obtains the GPS coordinates of the shoreside antennas 112, including potentially altitude data, before any connection is established between the on board antennas 312, 314 and the shore side antennas 112. The GPS data may in fact be obtained and filtered based upon the MCP's location, trajectory, speed, expected course and/or destination, and other factors, to predict which shore side antennas will be (1) within communication range, (2) when, and (3) for how long, in the future. The LSS 106 may first pair the forward antenna 314 to the shore side antenna exhibiting a strongest signal above an acceptable threshold signal level. In other words, in the equation [1] above, A=C=D=0 for the decision of which of the shore side antennas 112 to couple with the forward antenna 314 as the MCP 104 approaches a port. The aft antenna 312 is then paired with any other shore side antenna of acceptable signal strength, except the one paired with the forward antenna 314. In other words, for aft antenna 312, C=D=0 once the forward antenna 314 has been paired with a shore side antenna. The weight given to achieving spatial diversity is overriding in the pairing decision for antenna 312, even if the signal from the shoreside antenna paired with the forward antenna 314 is much stronger.

Throughout the process of pairing shore side antennae with onboard antennae, a communication channel is maintained between the MCP 104 and a satellite 108, although the amount of bandwidth reserved for the MCP 104 on this channel may be reduced once connectivity to a shore side antenna 112 is established.

In one embodiment, pairing between the on board antennae 312, 314 and the shore side antennae 112 are released in the same order as they are made as the MCP 104 departs from the port. Releasing a connection to a shore side antenna 112 may cause a reallocation (increase in allocation) of satellite bandwidth afforded to the MCP 104.

Effects of On-Board Activity

Figure 4:
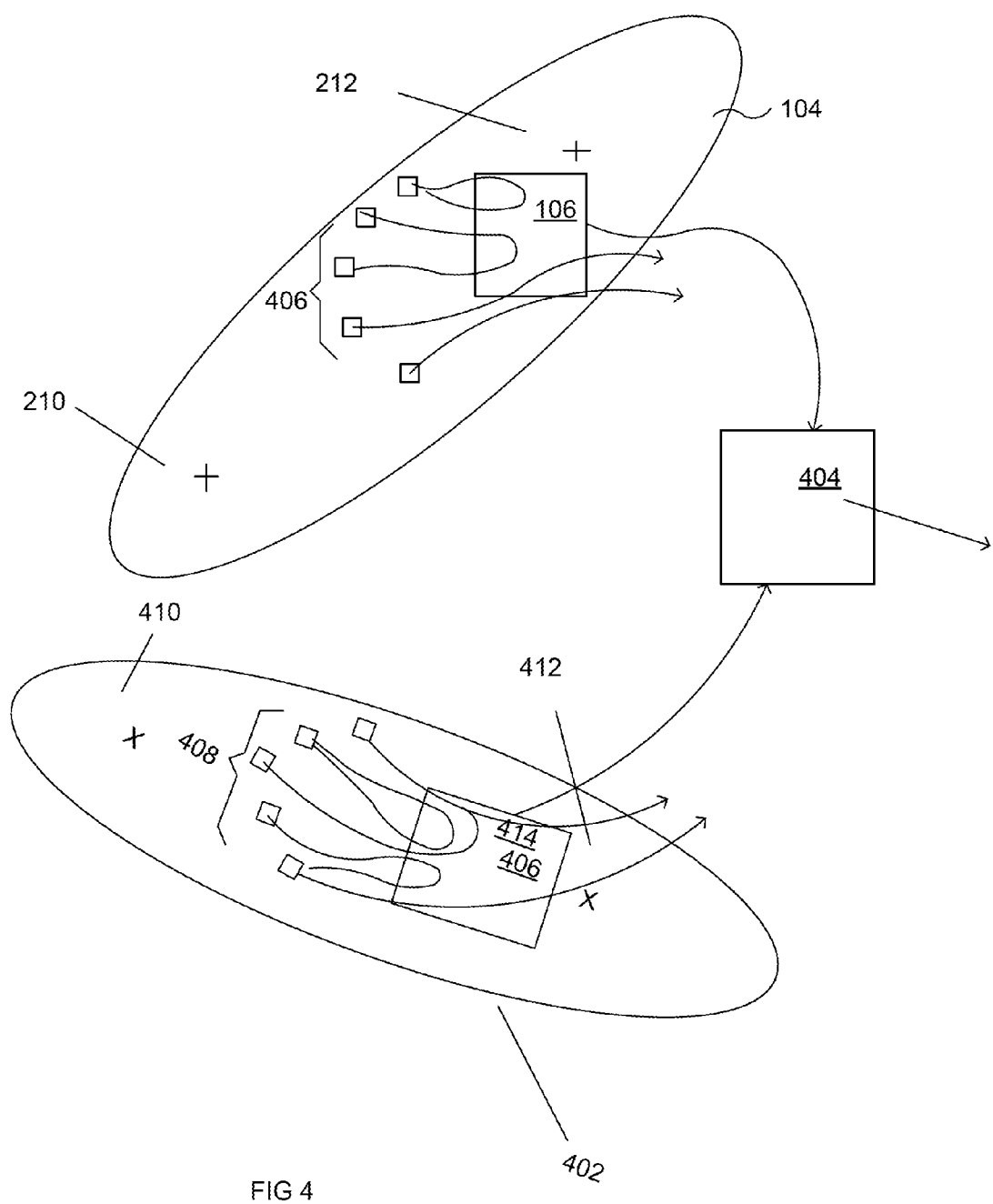
FIG. 4 illustrates an embodiment of MCP onboard and external network activity affecting an arbiter decision on antenna pairing.

FIG. 4 illustrates an embodiment of MCP onboard and external network activity affecting an arbiter decision on antenna pairing. The weighting constants C and D for a particular MCP may be influenced by a predicted effect on network bandwidth of on-board activity (activity between passenger devices, or between a passenger device and an on-board application, or between a passenger device and content cached on board).

$$E=A*\text{diversity}+B*\text{signal strength}+C*\text{front side bandwidth}+D*\text{backhaul bandwidth}$$

For example, C and D may be increased for a particular MCP pairing decision, because an aggregate or statistical model of inter-passenger communication and passenger utilization of cached content may indicate a likelihood that certain external content and/or communications will increase substantially once higher bandwidths are available. A tendency to view cached video is one example, especially if the video is a serialized show. Another example is a tendency to utilize social media communications between passengers; this may be indicative of an impending network bandwidth spike to global social media sites once higher bandwidth is available.

Referring to FIG. 4, two MCPs 104, 402 approach a port, where onboard antennas of each one (212, 210 and 412, 410 respectively) will be paired with port antennas. Leading up to the approach to port, there is onboard communication, content, and application activity by collective groups of passenger devices (406, 408 respectively). This activity is gated through a local service selector (106, 414 respectively) of each MCP. A statistical model of local activity is provided to arbiter logic 404 from each MCP. The arbiter 404 communicates with either the LSS's 106, 414 or the CBM 110, or both, to determine pairings between the MCP antennas and the port antennas.

Figure 5:
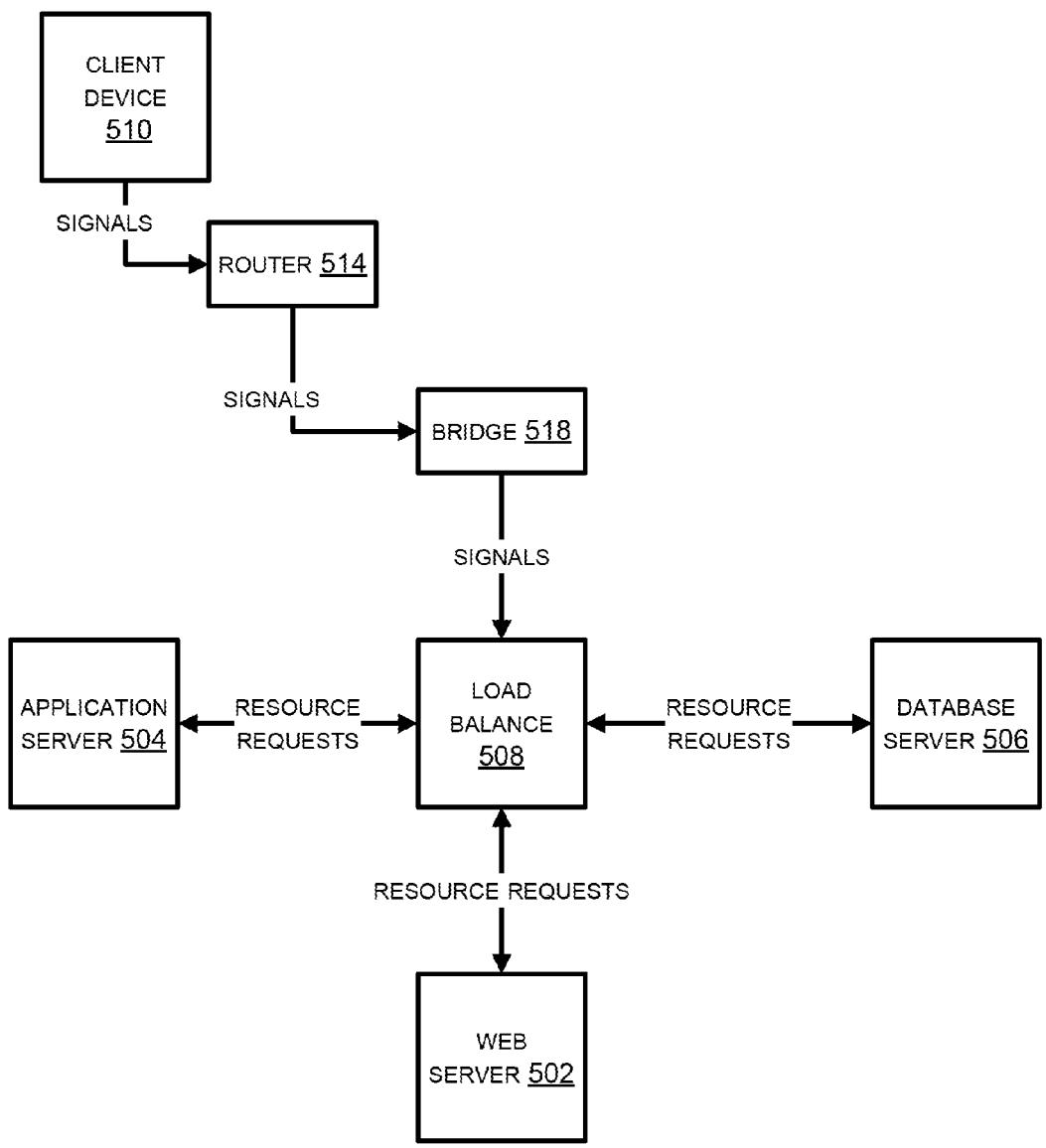
FIG. 5 illustrates an embodiment of a machine communication and processing network for implementing aspects of the described devices and actions.

FIG. 5 illustrates an embodiment of a machine communication and processing network for implementing aspects of the described devices and actions. A client device 510 outputs and receives signals in Internet protocol (IP) format. The signals are exchanged via a router 514 and a bridge 518 with a server system. The server system comprises a number of separate server devices, typically each implemented in the separated machine, although this is not necessarily the case. The signals from the client devices 510 are provided via a load balancing server 508 to one or more application server 504 and one or more database server 516. Load balancing server 508 maintains an even load in terms of requests in signals to the various other servers in the system including web server 502, application server 504, and database server 506. Each server may represent in effect multiple servers of that type. Logic of the application server 504 influences one or more processors of the application server 504 to interact with antennas 114 of an MCP 104, and possibly also to interact with a CBM system 110, to effect pairing with shoreside antennas 112 as described herein. This machine behavior may be triggered automatically upon reaching communication range of the shoreside antennas 112, or may be initiated or controlled via input devices to the application server 504, or may be initiated or controlled via a client device 510. The database server 506 may provide signals in response to resource requests related to the antenna pairing process. The signals applied to the database server 506 may cause one or more CPU of the database server 506 to access certain addresses, which correlates to certain rows and columns in a data organization in machine memory. These signals from the database server 506 may also be applied to application server 504 via the load balancing server 508 to influence the pairing of MCP and shoreside antennas.

The machine network of FIG. 5 may be implemented onboard an MCP, with one or more LSS 106 implementing the server group. The machine network may also be implemented as a global Internet service accessed by the MCP over a wireless communication interface (e.g., via satellite, 4G, or hi-speed WiFi).

Figure 6:
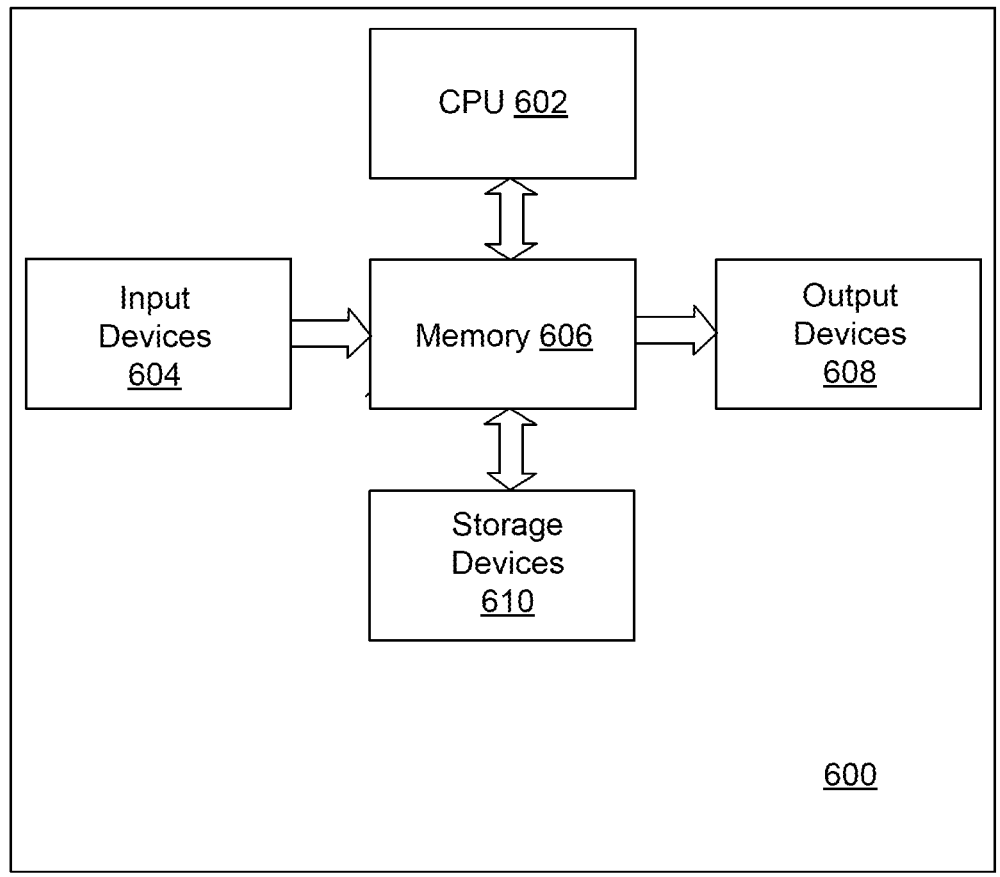
FIG. 6 illustrates an embodiment of a machine device which can implement various actions described herein (either client or server or intermediate device).

FIG. 6 illustrates an embodiment of a machine device which can implement various actions described herein (either client or server or intermediate device). The LSS 106 or CBM 110 may be implemented by such a device embodiment. Input devices 604 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 604 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 604 are provided via various machine signal conductors (e.g., busses or network interfaces) and circuits to memory devices 606. The memory devices 606 is typically what is known as a first or second level memory device, providing for storage (via configuration of matter or states of matter) of signals received from the input devices 604, instructions and information for controlling operation of the CPU 602, and signals from storage devices 610. Information stored in the memory devices 606 is typically directly accessible to processing logic 602 of the device. Signals input to the device cause the reconfiguration of the internal material/energy state of the memory device 606, creating in essence a new machine configuration, influencing the behavior of the device 600 by affecting the behavior of the CPU 602 with control signals (instructions) and data provided in conjunction with the control signals. Second or third level storage devices 610 may provide a slower but higher capacity machine memory capability. Examples of storage devices 610 are hard disks, optical disks, large capacity flash memories or other non-volatile memory technologies, and magnetic memories. The processing logic 602 may cause the configuration of the memory 606 to be altered by signals in storage devices 610. In other words, the CPU 602 may cause data and instructions to be read from storage devices 610 in the memory 606 from which may then influence the operations of CPU 602 as instructions and data signals, and from which it may also be provided to the output devices 608. The CPU 602 may alter the content of the memory of 606 by signaling to a machine interface of memory 606 to alter the internal configuration, and then converted signals to the storage devices 610 to alter its material internal configuration. In other words, data and instructions may be backed up from memory 606, which is often volatile, to storage devices 610, which are often non-volatile. Output devices 308 are transducers which convert electrical, optical, or wireless signals into physical phenomenon such as vibrations in the air, or patterns of light on a machine display, or vibrations (i.e., hepatic devices) or patterns of ink or other materials (i.e., printers and 3-D printers).

Implementations and Alternatives

The techniques and procedures described herein may be implemented via logic distributed in one or more computing devices. The particular distribution of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A system comprising:
   a vehicle, and;
   nontransitory logic that performs predictive pairing of multiple antenna of the vehicle with multiple fixed antenna of a port the vehicle is approaching, the predictive pairing performed using data obtained about the multiple fixed antenna obtained via a satellite, the predictive pairing influenced by a predicted effect on network bandwidth of device activity on board the vehicle.

2. The system of claim 1, further comprising:
   the logic applying a velocity and trajectory of the vehicle to the predictive pairing of the multiple antenna.

3. The system of claim 1, further comprising:
   the logic applying a known destination or route of the vehicle to the predictive pairing of the multiple antenna.

4. The system of claim 1, further comprising:
   the predictive pairing applying an aggregate or statistical model of inter-passenger device communication in the pairings of the antenna of the vehicle with the fixed antenna.

5. The system of claim 1, further comprising:
   the predictive pairing applying an aggregate or statistical model of passenger device utilization of content cached by the vehicle in the pairings of the antenna of the vehicle with the fixed antenna.

6. The system of claim 1, further comprising:
   the predictive pairing applying information about a presence or predicted presence of other vehicles in an area of the fixed antenna in the pairings of the antenna of the vehicle with the fixed antenna.

7. The system of claim 1, further comprising:
   the multiple antenna comprising exactly two antenna, one mounted forward and one mounted aft of the vehicle.

8. The system of claim 1, further comprising:
   the predictive pairing applying a tendency of passenger devices to utilize social media in the pairings of the antenna of the vehicle with the fixed antenna.

9. The system of claim 1, further comprising:
   the predictive pairing applying information about a departure times of other vehicles from an area of the fixed antenna in the pairings of the antenna of the vehicle with the fixed antenna.

* * * * *